United States Patent [19]
Supran et al.

[11] 3,834,849
[45] Sept. 10, 1974

[54] FIBER-ALIGNING EXTRUSION NOZZLE

[75] Inventors: Michael K. Supran, Hillsdale; Kantilal G. Parekh, Saddle Brook; Leonids Berzins, Hamburg, all of N.J.

[73] Assignee: Thomas J. Lipton, Inc., Englewood Cliffs, N.J.

[22] Filed: Dec. 13, 1972

[21] Appl. No.: 314,691

[52] U.S. Cl................. 425/206, 425/461, 426/513, 426/516
[51] Int. Cl........................... B29c 1/00, A22c 7/00
[58] Field of Search .......... 425/131, 206, 461, 513, 425/516

[56] References Cited
UNITED STATES PATENTS

| | | | |
|---|---|---|---|
| 1,397,571 | 11/1921 | Bowen | 425/377 X |
| 2,320,496 | 6/1943 | Wechsler | 425/461 |
| 3,464,087 | 9/1969 | Koch | 425/131 |

FOREIGN PATENTS OR APPLICATIONS

| | | | |
|---|---|---|---|
| 143,376 | 9/1951 | Australia | 425/131 |

Primary Examiner—R. Spencer Annear
Attorney, Agent, or Firm—Brumbaugh, Graves, Donohue & Raymond

[57] ABSTRACT

A fiber-aligning extrusion nozzle for extrudable, fiber containing compositions comprises a housing having an inlet and an outlet. One or more partition members are mounted within the housing between the inlet and the outlet, generally parallel to the axis of flow, dividing the housing longitudinally into passages that have closely spaced sides. The edge of each partition member adjacent the outlet of the housing is serrated to provide a plurality of teeth, adjacent teeth being inclined in opposite directions outwardly from the partition member. The partition members cause the formation of discrete streams of composition during extrusion and assist in aligning the fibers in the composition generally parallel to the axis of flow. The teeth disrupt at least the surface of the discrete streams causing them to recombine as a unitary mass at the outlet, while retaining the fibers therein in generally axial alignment. The edge of each partition member adjacent the inlet of the housing is sharpened to facilitate movement of the composition through the nozzle.

12 Claims, 3 Drawing Figures

PATENTED SEP 10 1974  3,834,849

FIBER-ALIGNING EXTRUSION NOZZLE

BACKGROUND OF THE INVENTION

In various fiber containing compositions, the alignment of the fibers in the composition may materially affect its utility, texture or appearance. For example, reformed meat products utilize meat trimmings, by-product meats and, sometimes, vegetable protein fibers, such as soybean fibers, to produce a meat paste or similar meat composition that has a more attractive appearance than the meat trimmings or by-products in their original state. Despite their high nutritional value, reformed meat products are not as greatly desired by the consuming public as whole meat, because of their texture and appearance. To improve the texture and appearance of reformed meat products, it has been customary to add a proportion of coarsely chopped meat or spun vegetable protein fibers. It has been determined, moreover, that as the proportion of meat or vegetable fibers aligned generally in a particular direction increases, the texture and appearance of the reformed meat product more nearly approaches that of whole meat.

Substantial fiber alignment in a reformed meat product can be achieved by extruding a meat composition through a nozzle having closely-spaced or tapered sides. As the meat composition flows along the sides of the nozzle, the fibers in the meat composition are oriented in substantially parallel alignment with each other and the axis of flow, over a surface adjacent the nozzle sides, to a depth of about 0.5 cm. By providing a nozzle with a minimum spacing between its sides of less than 1.0 cm, fibers throughout the meat composition will be in substantially parallel alignment with each other and the axis of flow, the percentage of aligned fibers being in excess of 70 percent.

To obtain substantial alignment of fibers without limiting the thickness of the extruded meat product, the intermediate portion of the nozzle may have a series of partition members dividing the nozzle into a number of passages having closely spaced sides. Thus, fiber alignment is effected in the passages and the individual streams of compositions flowing through each passage can be recombined to provide an extruded meat product of the desired thickness.

In practice, however, it has been found that the presence of partition members causes a number of problems. One such problem is that connective tissue in meat compositions tends to get caught on the leading edges of the partition members and clog the passages in the extrusion nozzle, reducing its efficiency or blocking it completely. Another problem is that as meat composition flows through the nozzle, frictional forces are built up which melt the fats in the meat composition adjacent the surfaces of the partition members and the walls of the nozzle. When two streams of meat composition are brought together, the films of melted fat on the surfaces of the streams inhibit proper recombining of the streams and produce undesirable layering in the extruded meat product.

SUMMARY OF THE INVENTION

The precent invention relates to an improved fiber-aligning extrusion nozzle for extrudable, fiber containing compositions, such as meat compositions. The nozzle comprises a housing having an inlet and an outlet. One or more partition members, such as plates, are mounted within the housing between the inlet and the outlet, parallel to the axis of flow, dividing the housing longitudinally into a plurality of passages that have closely-spaced sides. The plates or other partition members cause the formation of discrete streams of composition during extrusion and assist in aligning the fibers in the composition generally parallel to the axis of flow.

The edge of each plate or other partition member adjacent the outlet of the nozzle housing has means associated with it for preventing the formation of discrete layers in the composition as it is extruded from the nozzle, while retaining the fibers therein generally in alignment. For example, the edge may be serrated to provide a plurality of teeth, adjacent teeth being inclined in opposite directions outwardly from the plate. The inclined teeth create grooves and ridges in both the upper and lower surfaces of the various streams of composition that flow through the nozzle passages, disrupting any separating films, such as films of melted fats, that may be on the surfaces of the streams.

The edge of each plate adjacent the inlet of the nozzle housing is sharpened to facilitate the movement of connective tissue, such as found in meat compositions, through the nozzle. Connective tissue that is caught on the edges of the plates, and which might otherwise clog the nozzle, is severed by the sharpened edges of the plates and then flows on through the nozzle.

The plates are spaced longitudinally from the inlet of the housing to provide an unobstructed space sufficient to allow even distribution of entering composition to each of the passages. The plates are similarly spaced longitudinally from the outlet, leaving an unobstructed space for the various streams of composition flowing through the nozzle passages to recombine before being extruded through the outlet of the housing. In a preferred embodiment of the invention, the nozzle has a tapered housing and the plates are arranged to form tapered passages in the housing. The tapered passages product alignment of a greater number of fibers in a composition than is produced by parallel-sides passages. This may result from an increase in pressure and stress in the composition as it flows through the gradually diminishing cross-sections of the passages.

As can be seen from the above description, the inclined teeth of the present invention prevent the formation of undesirable, discrete layers in an extruded composition, while retaining the fiber alignment of the composition. In addition, the sharpened leading edges of the plates of the invention sever any connective tissue which might be caught on the edges of the plates, to facilitate movement of the composition.

BRIEF DESCRIPTION OF THE DRAWING

For a better understanding of the invention, reference may be made to the following description of an exemplary embodiment taken in conjunction with the figures of the accompanying drawing, in which.

DESCRIPTION

Figure 1:
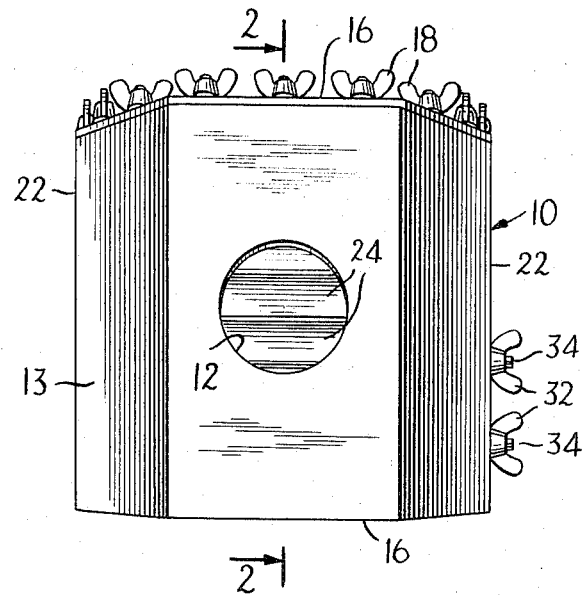
FIG. 1 is an end view of an extrusion nozzle according to the invention.
Figure 2:
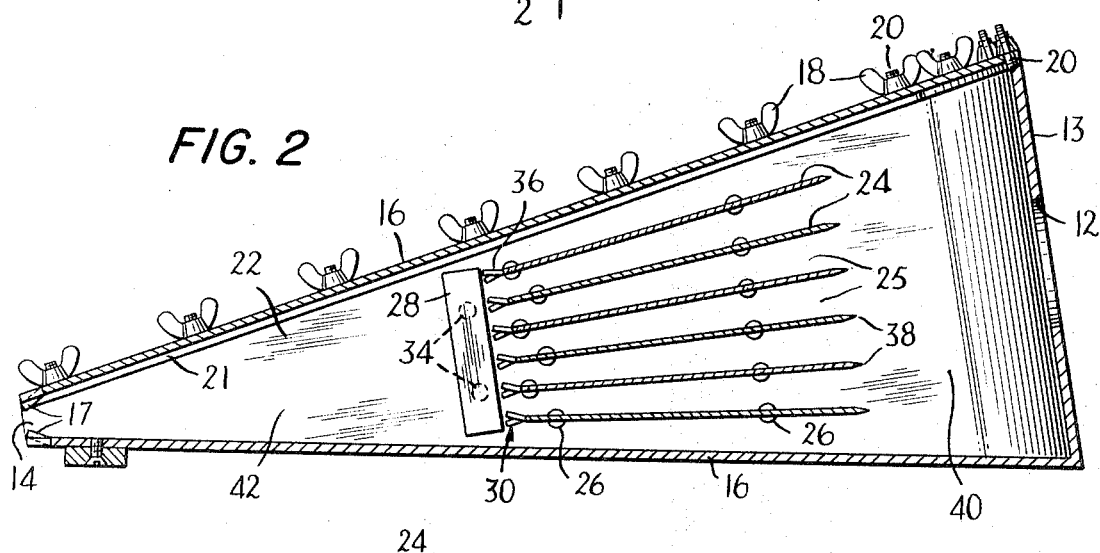
FIG. 2 is a sectional side view of the nozzle of FIG. 1, taken along view line 2—2.
Figure 3:
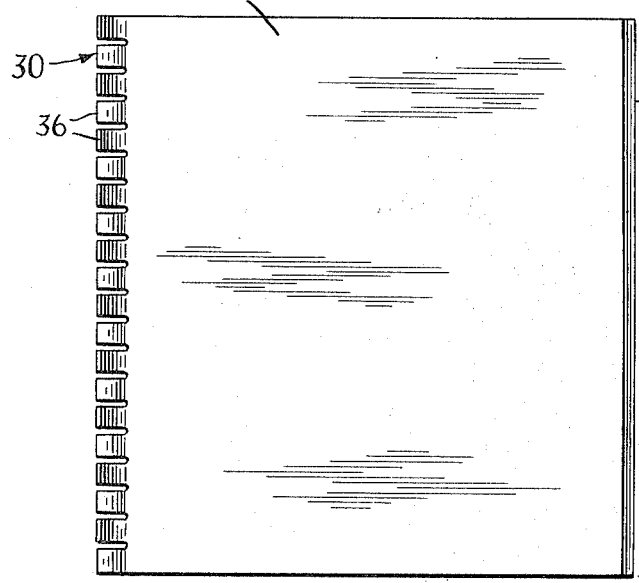
FIG. 3 is a top view of a plate used in the nozzle of FIG. 1.

In an exemplary embodiment of the invention, as shown in FIGS. 1–3, an extrusion nozzle for an extrudable fiber containing meat composition comprises a housing 10 that is a truncated triangle in longitudinal cross-section. The housing 10 may be formed of any durable material, such as stainless steel, that will not adversely affect the wholesomeness of the meat composition passing through it and that is able to withstand the pressure developed by the extrusion process. Although the housing 10 has rectilinear converging sides in the illustrated embodiment, it is within the scope of the invention for the housing to have parallel and curvilinear sides, resembling, for example, a cone or tube or rectangular solid. The housing 10 has a circular inlet 12 formed in its base 13 and a slot-like outlet 14 formed in its apex. The edges of the converging sides 16 of the housing 10 adjacent the outlet 14 are serrated and alternate serrations 17 are inclined inwardly toward the opposite converging side 16, for a purpose that is explained hereinafter.

One of the converging sides 16 is removable from the housing to provide access to the interior of the housing for cleaning or repairs. The removable converging side 16 is secured to the housing 10 by wing nuts 18 which are screwed onto threaded posts 20. The posts 20 extend upwardly from a flange 21 formed on the parallel sides 22 and the base 13 of the housing and pass through holes formed in the removable converging side 16 adjacent its edges. The edges of the base 13 adjacent the parallel sides 22 are bent toward the outlet 14 to eliminate 90° corners which might trap the meat composition.

Six plates 24 are provided within the housing 10 between the inlet 12 and the outlet 14, dividing the housing 10 into seven passages 25 that have closely spaced sides. The plates 24 are rectangular pieces of any material, inert to the extrudable composition, that can be sharpened to and will retain a knife edge, as described below. They are oriented generally parallel to the axis of flow through the nozzle, from the inlet 12 to the outlet 14, and may be parallel to each other or preferably, as shown, may converge to correspond to the converging sides 16 of the housing 10. The converging sides 16 of the housing 10 and the converging plates 24 cause the passages 25 to taper along the axis of flow. As noted above, such tapered passages 25 produce alignment of a greater number of fibers in the meat composition than is produced by parallel-sided passages.

Slotted screws 26 extend from the parallel sides 22 of the housing 10 to hold the plates 24 in position, spaced apart from each other. To prevent the plates 24 from being pushed longitudinally through the housing 10, a stop 28 is provided along one side of the edges 30 of the plates 24 adjacent the outlet 14. The stop 28 is retained in place by wing nuts 32 screwed onto threaded pins 34 projecting from the stop 28 through holes in one parallel side 22 of the housing 10.

As shown in FIG. 3, the edge 30 of each plate 24 adjacent the outlet 14 is serrated to provide a plurality of closely-spaced teeth 36. The teeth 36 are inclined outwardly from the plates 24 such that adjacent teeth 36 are inclined in opposite directions. The inclined teeth 36 create alternating grooves and ridges in the upper and lower surfaces of the streams of meat composition that flow through each passage 25. The inclination of the teeth 36 is not sufficient, however, to create turbulence in the flow of meat composition sufficient to affect the alignment of the fibers in the meat composition.

The grooves and ridges in the upper and lower surfaces of the streams of meat composition effectively disrupt the films of melted fat that are created on the surfaces of the streams by the heat and pressure of extrusion. In the absence of such disruption, the films of melted fat on adjacent streams of meat composition inhibit proper recombination of the streams and separate the streams into undesirable discrete layers of meat composition in the extruded meat composition product. With the disruption of the fat films on adjacent streams of meat composition, the distinct separation between streams is broken down and the meat composition in each stream contacts and recombines with the meat composition in adjacent streams, particularly along the generally vertical portions of the surfaces of the streams between each ridge and its adjacent grooves.

As shown in the drawings, the surfaces of streams adjacent the converging sides 16 of the housing 10 are not engaged by the teeth 36 and consequently fat films on the surfaces are not disrupted. While the lack of fat film disruption on the surface does not interfere with proper recombining of the streams of meat composition, it may be desired to roll the extruded meat composition product upon itself or to lay the extruded product from one nozzle on top of the product from another nozzle. The serrations 17 in the edges of the converging sides 16 adjacent the outlet 14 effectively prevent layering of the extruded product in those situations by disrupting the fat films in the same manner as the teeth 36.

The edge 38 of each plate 24 adjacent the inlet 12 is sharpened to sever any connective tissue in the meat composition that might be caught on the edge 38 and thereby clog adjacent passages 25. Although the connective tissue is in pieces small enough to flow through the passages 25, individual pieces of connective tissue may become wrapped around an edge 38 of a plate 24. If such debris builds up, the passages 25 may become constricted and the flow of meat composition through the nozzle may be reduced. The sharpened edges 38 sever such pieces of tissue and keep the passages 25 open without having to stop the extrusion process to clean off the edges 38.

The plates are spaced from the inlet 12 and the outlet 14. The unobstructed space 40 between the inlet 12 and the edges 38 of the plates 24 allows the composition entering the housing 10 to distribute evenly across the plates 24 to the passages 25. The unobstructed space 42 between the edges 30 of the plates 24 and the outlet 14 allows the streams of composition that flow through each passage 25 to recombine before the composition is extruded through the outlet 14 of the housing 10.

In operation, meat composition is fed into the nozzle through the inlet 12. In the unobstructed space 40, the composition spreads out and is distributed across the plates 24 to each passage 25. As more meat composition is fed into the inlet 12, it is pushed through the passages 25 along the plates 24. The fibers of the meat composition adjacent the sides of the passages 25 are aligned generally parallel to the axis of flow and the narrowness of the passages 25 results effectively in the alignment of a substantial proportion of fibers in each passage 25. At the edges 30 of the plates 24, the teeth 36 create alternating grooves and ridges in the surfaces of the streams of meat composition that flow through the passages 25. The streams recombine in the unobstructed space 40 and the final meat composition product then is extruded out of the nozzle through the outlet 14.

It will be understood that the above described embodiment is merely exemplary and that those skilled in the art may make many variations and modifications without departing from the spirit and scope of the invention. All such modifications and variations are intended to be within the scope of the invention as defined in the appended claims.

We claim:

1. A fiber-aligning extrusion nozzle for extrudable, fiber containing composition comprising a housing having an inlet, an outlet, and at least one partition member mounted therein between the inlet and the outlet and generally parallel to the axis of flow, the partition member dividing the housing longitudinally into at least two passages having sides spaced so as to effect alignment of a substantial proportion of fibers generally parallel to the axis of flow and being adapted to form at least two discrete streams of composition, the partition member further having means associated with an edge thereof adjacent the outlet of the housing for preventing the formation of discrete layers of composition as the composition is extruded from the nozzle, while retaining the fibers therein in general alignment.

2. A fiber-aligning extrusion nozzle according to claim 1, wherein the preventing means includes means for disrupting surfaces of the streams of composition, while retaining the fibers therein in general alignment.

3. A fiber-aligning extrusion nozzle according to claim 2, wherein the disrupting means includes a plurality of teeth, adjacent teeth being inclined in opposite directions outwardly from the partition member.

4. A fiber-aligning extrusion nozzle according to claim 1, wherein an edge of the partition member adjacent the inlet of the housing is sharpened.

5. A fiber-aligning extrusion nozzle according to claim 1, wherein the partition member is a plate.

6. A fiber-aligning extrusion nozzle according to claim 1, wherein the housing is tapered from the inlet to the outlet.

7. A fiber-aligning extrusion nozzle according to claim 6, wherein there is provided a plurality of partition members aligned to assume a converging attitude.

8. A fiber-aligning extrusion nozzle according to claim 1, wherein the partition member is spaced longitudinally from the inlet.

9. A fiber-aligning extrusion nozzle according to claim 1, wherein the partition member is spaced longitudinally from the outlet.

10. A fiber-aligning nozzle according to claim 1, wherein the outlet has means associated therewith for disrupting surfaces of the composition as it is extruded from the nozzle, while retaining the fibers therein in general alignment.

11. A fiber-aligning extrusion nozzle for extrudable, fiber containing compositions comprising a housing having an inlet, an outlet, and at least one plate mounted therein between the inlet and the outlet and generally parallel to the axis of flow, the plate dividing the housing longitudinally into at least two passages having sides spaced so as to effect alignment of a substantial proportion of fibers generally parallel to the axis of flow and being adapted to form at least two discrete streams of composition, the plate further having an edge adjacent the outlet serrated to provide a plurality of teeth, adjacent teeth being inclined in opposite directions outwardly from the plate.

12. A fiber-aligning extrusion nozzle for extrudable, fiber containing composition comprising a housing having an inlet, an outlet, and at least one partition member mounted therein between the inlet and the outlet and generally parallel to the axis of flow, the partition member dividing the housing longitudinally into at least two passages having sides spaced so as to effect alignment of a substantial proportion of fibers generally parallel to the axis of flow and being adapted to form at least two discrete streams of composition, the partition member further having means associated with an edge thereof adjacent the outlet of the housing for preventing the formation of discrete layers of composition as the composition is extruded from the nozzle, while retaining the fibers therein in general alignment and maintaining the nozzle interior free of any matter additional to composition already flowing through the nozzle past said edge of the partition member and free of any composition additional to the composition already flowing through the nozzle past said edge of the partition member, the preventing means including means for disrupting surfaces of the streams of composition.

* * * * *